United States Patent
Lee et al.

(10) Patent No.: US 11,925,214 B2
(45) Date of Patent: Mar. 12, 2024

(54) AEROSOL GENERATING DEVICE AND OPERATING METHOD THEREOF

(71) Applicant: KT&G CORPORATION, Daejeon (KR)

(72) Inventors: Won Kyeong Lee, Guri-si (KR); Paul Joon Sunwoo, Seoul (KR); Sung Wook Yoon, Suwon-si (KR); Dae Nam Han, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 841 days.

(21) Appl. No.: 16/978,279

(22) PCT Filed: May 8, 2020

(86) PCT No.: PCT/KR2020/006075
§ 371 (c)(1),
(2) Date: Sep. 4, 2020

(87) PCT Pub. No.: WO2021/020699
PCT Pub. Date: Feb. 4, 2021

(65) Prior Publication Data
US 2023/0096029 A1    Mar. 30, 2023

(30) Foreign Application Priority Data

Jul. 29, 2019 (KR) .................... 10-2019-0092001

(51) Int. Cl.
*A24F 40/57*     (2020.01)
*G05D 23/24*     (2006.01)

(52) U.S. Cl.
CPC ......... *A24F 40/57* (2020.01); *G05D 23/2401* (2013.01)

(58) Field of Classification Search
CPC ......... H05B 1/0227; H05B 1/02; A24F 40/10; A24F 40/42; A24F 40/50; A24F 40/57
See application file for complete search history.

(56) References Cited

U.S. PATENT DOCUMENTS

2014/0321837 A1    10/2014    Flick
2017/0280779 A1    10/2017    Qiu
(Continued)

FOREIGN PATENT DOCUMENTS

JP    2000-041654 A      2/2000
JP    4074047 B2 *       4/2008
(Continued)

OTHER PUBLICATIONS

International Search Report of PCT/KR2020/006075 dated Aug. 7, 2020.
(Continued)

*Primary Examiner* — Jean F Duverne
(74) *Attorney, Agent, or Firm* — Sughrue Mion, PLLC (57) ABSTRACT

An aerosol generating device includes a heater configured to heat an aerosol generating material to generate aerosol; a controller configured to: calculate a current flowing through the heater based on a predefined resistance of the heater and power supplied to the heater, measure the current flowing through the heater, and control the power supplied to the heater based on a difference between the calculated current and the measured current.

5 Claims, 3 Drawing Sheets

(56) References Cited

U.S. PATENT DOCUMENTS

| | | |
|---|---|---|
| 2018/0206557 A1 | 7/2018 | Peleg et al. |
| 2018/0220713 A1 | 8/2018 | Chang et al. |
| 2018/0303161 A1 | 10/2018 | Bilat |
| 2019/0069599 A1 | 3/2019 | Monsees et al. |
| 2020/0214352 A1 | 7/2020 | Memari et al. |
| 2020/0260791 A1 | 8/2020 | Lee et al. |

FOREIGN PATENT DOCUMENTS

| | | | |
|---|---|---|---|
| KR | 10-2018-0044978 A | 5/2018 | |
| KR | 10-2019-0035486 A | 4/2019 | |
| WO | WO-2015107552 A1 * | 7/2015 | ........... A24F 47/008 |
| WO | 2018/202403 A1 | 11/2018 | |

OTHER PUBLICATIONS

Written Opinion of PCT/KR2020/006075 dated Aug. 7, 2020.
Office Action dated Apr. 27, 2023 from the Chinese Patent Office in Application No. 202080002059.8.
Extended European Search Report dated Nov. 19, 2021 in EP Application No. 20761494.2.

\* cited by examiner

AEROSOL GENERATING DEVICE AND OPERATING METHOD THEREOF

CROSS REFERENCE TO RELATED APPLICATIONS

This application is a National Stage of International Application No. PCT/KR2020/006075, filed May 8, 2020, claiming priority to Korean Patent Application No. 10-2019-0092001, filed Jul. 29, 2019.

TECHNICAL FIELD

The present disclosure relates to aerosol generating device and an operating method thereof.

BACKGROUND ART

Recently, demand for an alternative to traditional cigarettes has increased. For example, there is growing demand for an aerosol generating device that generates aerosol by heating an aerosol generating material in cigarettes rather than by combusting cigarettes. Accordingly, there has been active research into a heating-type cigarette and a heating-type aerosol generating device.

A heater included in an aerosol generating device is supplied with power and heats an aerosol generating material. To uniformly generate a satisfactory aerosol, it is very important to control power supplied to a heater properly. To do so, it is necessary to accurately determine the temperature of the heater when an aerosol generating device does not include a temperature sensor.

DISCLOSURE OF INVENTION

Technical Problem

One or more embodiments include an aerosol generating device tor generating uniform aerosol by accurately estimating the temperature of a heater. Embodiments are not limited to those described above, and other embodiments may be inferred from descriptions below.

Additional aspects will be set forth in part in the description which follows and, in part, will be apparent from the description, may be learned by practice of the presented embodiments of the disclosure.

Solution to Problem

According to one or more embodiments, an aerosol generating device includes a heater configured to heat an aerosol generating material to generate aerosol; a controller configured to: calculate a current flowing through the heater based on a predefined resistance of the heater and power supplied to the heater, measure the current flowing through the heater, and control the power supplied to the heater based on a difference between the calculated current and the measured current.

The controller may estimate a temperature of the heater based on the difference, and adjust the power supplied to the heater according to the estimated temperature.

The aerosol generating device may further include a memory storing a relationship between a plurality of current difference values and a plurality of heater temperature values as a lookup table.

The controller may access the lookup table, identify a temperature corresponding to the difference between the calculated current and the measured current, and estimate the temperature of the heater based on the identified temperature.

According to one or more embodiments, an operating method of an aerosol generating device includes supplying power to a heater; calculating a current flowing through the heater by the power based on a predefined resistance of the heater and power supplied to the heater measuring the current flowing through the heater; and controlling the power supplied to the heater, based on a difference between the calculated current and the measured current.

The comparing of the supply current with the fed-back current may include obtaining the difference between the calculated current and the measured current.

The controlling of the power supplied to the heater may include estimating a temperature of the heater based on the difference; and adjusting the power supplied to the heater according to the estimated temperature.

The estimating of the temperature of the heater may include accessing a pre-stored lookup table showing a relationship between a plurality of heater temperature values and a plurality of current difference values; identifying a temperature corresponding to the difference between the calculated current and the measured current, according to the lookup table; and estimating the temperature of the heater based on the identified temperature.

Advantageous Effects of Invention

According to embodiments of the present disclosure, an aerosol generating device may precisely estimate the temperature of the heater without a separate temperature sensor, and control power supplied to the heater according to the estimated temperature. Accordingly, the user can be provided with a uniform smoking experience.

BRIEF DESCRIPTION OF DRAWINGS

The above and other aspects, features, and advantages of certain embodiments of the disclosure will be more apparent from the following description taken in conjunction with the accompanying drawings, in which.

BEST MODE FOR CARRYING OUT THE INVENTION

According to one or more embodiments, an aerosol generating device includes a heater configured to heat an aerosol generating material to generate aerosol; a controller configured to: calculate a current flowing through the heater based on a predefined resistance of the heater and power supplied to the heater, measure the current flowing through the heater, and control the power supplied to the heater based on a difference between the calculated current and the measured current.

Mode for the Invention

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. There are terms discretionally selected by an applicant on particular occasions. These terms will be explained in detail in relevant description. Therefore, terms used herein are not just names but should be defined based on the meaning of the terms and the whole content of the present disclosure.

In addition, unless explicitly described to the contrary, the word "comprise" and variations such as "comprises" or "comprising" will be understood to imply the inclusion of stated elements but not the exclusion of any other elements. In addition, terminology such as "part (or unit)" and "module" may indicate a unit which processes at least one function or operation and may be implemented by hardware, software, or a combination thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed a being limited to the embodiments set forth herein.

Hereinafter, embodiments of the present disclosure will be described in detail with reference to the drawings.

Figure 1:
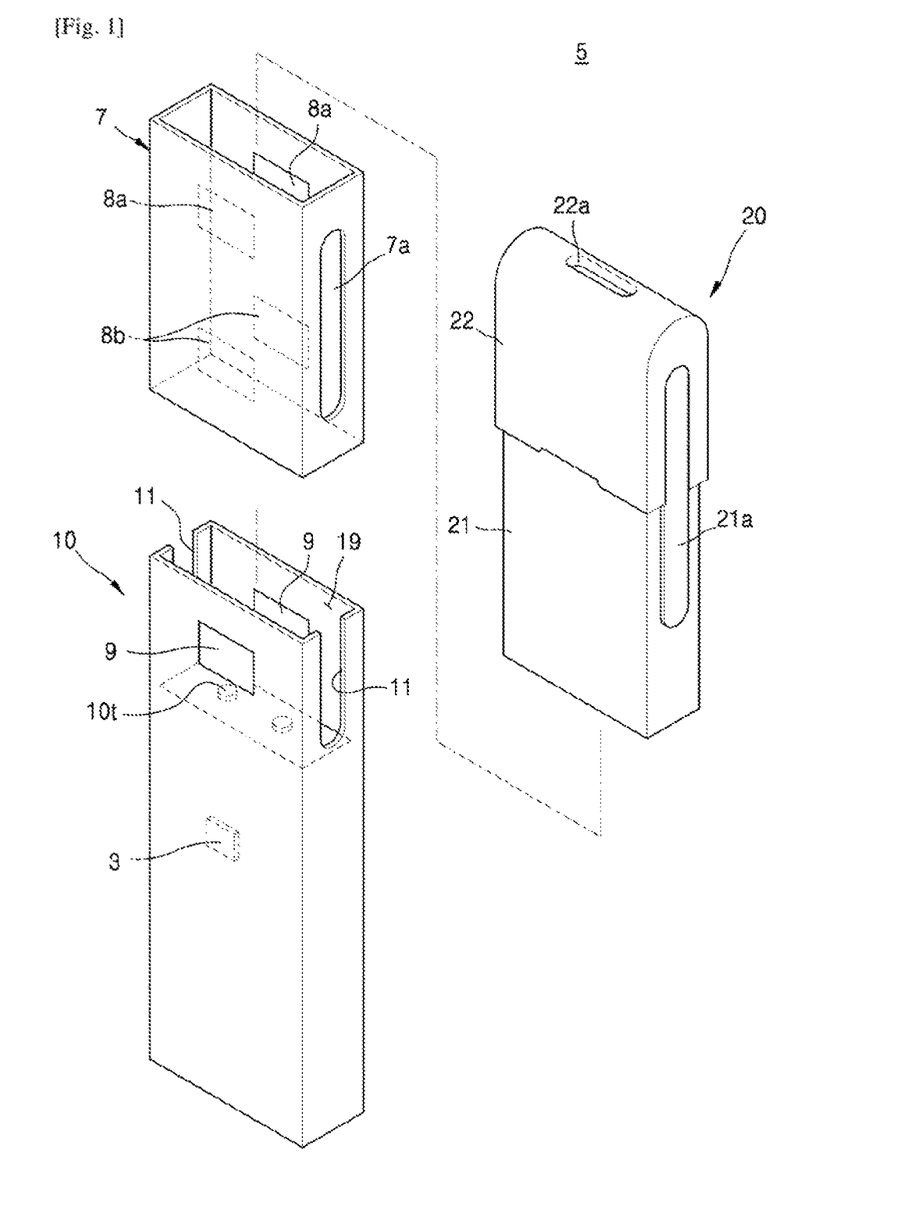
FIG. 1 is an exploded perspective view schematically illustrating a coupling relationship between a replaceable cartridge containing an aerosol generating material and an aerosol generating device including the same, according to an embodiment.

FIG. 1 is an exploded perspective view schematically illustrating a coupling relationship between a replaceable cartridge containing an aerosol generating material and an aerosol generating device including the same, according to an embodiment.

Referring to FIG. 1, an aerosol generating device 5 includes the cartridge 20 containing the aerosol generating material and a main body 10 supporting the cartridge 20.

The cartridge 20 containing the aerosol generating material may be coupled to the main body 10. A portion of the cartridge 20 may be inserted into an accommodation space 19 of the main body 10 so that the cartridge 20 may be mounted on the main body 10.

The cartridge 20 may contain an aerosol generating material in at least one of, for example, a liquid state, a solid state, a gaseous state, or a gel state. The aerosol generating material may include a liquid composition. For example, the liquid composition may be a liquid including a tobacco-containing material having a volatile tobacco flavor component, or a liquid including a non-tobacco material.

For example, the liquid composition may include one component of water, solvents, ethanol, plant extracts, spices, flavorings, and vitamin mixtures, or a mixture of these components. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. In addition, the liquid composition may include an aerosol forming agent such as glycerin and propylene glycol.

For example, the liquid composition may include any weight ratio of glycerin and propylene glycol solution to which nicotine salts are added. The liquid composition may include two or more types of nicotine salts. Nicotine salts may be formed by adding suitable acids, including organic or inorganic acids, to nicotine. Nicotine may be a naturally generated nicotine or synthetic nicotine and may have any suitable weight concentration relative to the total solution weight of the liquid composition.

Acid for the formation of the nicotine salts may be appropriately selected in consideration of the rate of nicotine absorption in the blood, the operating temperature of the aerosol generating device 5, the flavor or savor, the solubility, or the like. For example, the acid for the formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, cupric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid, and malic acid, or may be a mixture of two or more acids selected from the above-described group, hut is not limited thereto.

The cartridge 20 may be operated by an electrical signal or a wireless signal transmitted from the main body 10 to perform a function of generating aerosol by converting the phase of the aerosol generating material inside the cartridge 20 to a gaseous phase. The aerosol may refer to a gas in which vaporized particles generated from an aerosol generating material are mixed with air.

For example, in response to receiving the electrical signal from the main body 10, the cartridge 20 may convert the phase of the aerosol generating material by heating the aerosol generating material, using, for example, an ultrasonic vibration method or an induction beating method. In an embodiment, the cartridge 20 may include its own power source and generate aerosol based on an electric control signal or a wireless signal received from the main body 10.

The cartridge 20 may include a liquid storage 21 accommodating the aerosol generating material therein, and an atomizer performing a function of converting the aerosol generating material of the liquid storage 21 to aerosol.

When the liquid storage 21 "accommodates the aerosol generating material" therein, it means that the liquid storage 21 functions as a container simply holding an aerosol generating material and that the liquid storage 21 includes therein an element impregnated with (i.e., containing) an aerosol generating material, such as a sponge, cotton, fabric, or porous ceramic structure.

The atomizer 110 may include, for example, a liquid delivery element (e.g., a wick) for absorbing the aerosol generating material and maintaining the same in an optimal state for conversion to aerosol, and a heater heating the liquid delivery element to generate aerosol.

The liquid delivery element may include at least tare of, for example, a cotton fiber, a ceramic fiber, a glass fiber, and porous ceramic.

The heater may include a metallic material such as copper, nickel, tungsten, or the like to heat the aerosol generating material delivered to the liquid delivery element by generating heat using electrical resistance. The heater may be implemented by, for example, a metal wire, a metal plate, a ceramic heating element, or the like. Also, the heater may be implemented by a conductive filament using a material such as a nichrome wire, and may be wound around or arranged adjacent to the liquid delivery element.

In addition, the atomizer may be implemented by a heating element in the form of a mesh or plate, which absorbs the aerosol generating material and maintains the same in an optimal state for conversion to aerosol, and generates aerosol by heating the aerosol generating material. In this case, a separate liquid delivery element may not be required.

At least a portion of the liquid storage 21 of the cartridge 20 may include a transparent portion so that the aerosol generating material accommodated in the cartridge 20 may be visually identified from the outside. The liquid storage 21 includes a protruding window 21a protruding from the liquid storage 21, so that the liquid storage 21 may be inserted into a groove 11 of the main body 10 when coupled to the main body 10. A mouthpiece 22 and/or the liquid storage 21 may be entirely formed of transparent plastic or glass. Alternatively, only the protruding window 21a may be formed of a transparent material.

The main body 10 includes a connection terminal 10t arranged inside the accommodation space 19. When the liquid storage 21 of the cartridge 20 is inserted into the accommodation space 19 of the main body 10, the main body 10 may provide power to the cartridge 20 or supply a signal related to an operation of the cartridge 20 to the cartridge 20, through the connection terminal 10t.

The mouthpiece 22 is coupled to one end of the liquid storage 21 of the cartridge 20. The mouthpiece 22 is a portion of the aerosol generating device 5, which is to be inserted into a user's mouth. The mouthpiece 22 includes a discharge hole 22a for discharging aerosol generated from the aerosol generating material inside the liquid storage 21 to the outside.

The slider 7 is coupled to the main body in such a way that the slider 7 may move on the main body 10. The slider 7 covers or exposes at least a portion of the mouthpiece 22 of the cartridge 20 coupled to the main body 10 by moving with respect to the main body 10. The slider 7 includes an elongated hole 7a exposing at least a portion of the protruding window 21a of the cartridge 20 to the outside.

As shown FIG. 1, the slider 7 may have a shape of a hollow container with both ends opened, but the structure of the slider 7 is not limited thereto. For example, the slider 7 may have a bent plate structure having a clip-shaped cross-section, which is movable with respect to the main body 10 while being coupled to an edge of the main body 10. In another example, the slider 7 may have a curved semi-cylindrical shape with a curved arc-shaped cross section.

The slider 7 may include a magnetic body for maintaining the position of the slider 7 with respect to the main body 10 and the cartridge 20. The magnetic body may include a permanent magnet or a material such as iron, nickel, cobalt, or an alloy thereof.

The magnetic body may include two first magnetic bodies 8a facing each other, and two second magnetic bodies 8b facing each other. The first magnetic bodies 8a may be spaced apart from the second magnetic bodies 8b in a longitudinal direction of the main body 10 (i.e., the direction in which the main body 10 extends), which is a moving direction of the slider 7.

The main body 10 includes a fixed magnetic body 9 arranged on a path along which the first magnetic bodies 8a and the second magnetic bodies 8b of the slider 7 move as the slider 7 moves with respect to the main body 10. Two fixed magnetic bodies 9 of the main body 10 may be mounted to face each other with the accommodation space therebetween.

The slider 7, the slider 7 may be stably maintained in a position where an end of the mouthpiece 22 is covered or exposed by a magnetic force acting between the fixed magnetic body 9 and the first magnetic body 8a or between the fixed magnetic body 9 and the second magnetic body 8b.

The main body 10 includes a position change detecting sensor 3 arranged on the path along which the first magnetic body 8a and the second magnetic body 8b of the slider 7 move as the slider 7 moves with respect to the main body 10. The position change detecting sensor 3 may include, for example, a Hall integrated circuit (IC) that uses the Hall effect to detect a change in a magnetic field, and may generate a signal based on the detected change.

In the aerosol generating device 5 according to the above-described embodiment horizontal cross sections of the main body 10, the cartridge 20, and the slider 7 have approximately rectangular shapes (i.e., when viewed in the longitudinal direction), but in the embodiments, the shape of the aerosol generating device 5 is not limited. The aerosol generating device 5 may have, for example, a cross-sectional shape of a circle, an ellipse, a square, or various polygonal shapes. In addition, the aerosol generating device 5 is not necessarily limited to a structure that extends linearly, and may be curved in a streamlined shape or bent at a preset angle in a specific area to be easily held by the user.

Figure 2:
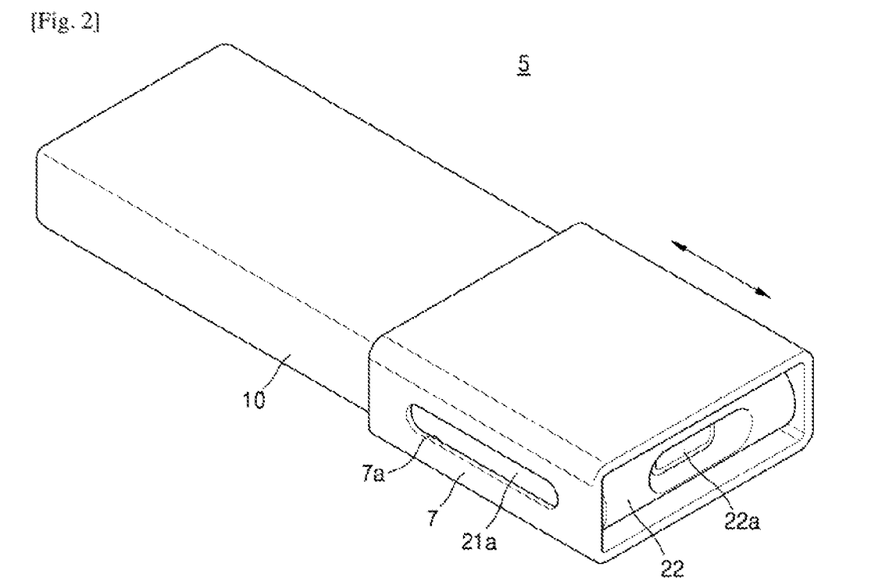
FIG. 2 is a perspective view of an exemplary operating state of the aerosol generating device of FIG. 1.

FIG. 2 is a perspective view of an exemplary operating state of the aerosol generating device according to the embodiment illustrated in FIG. 1.

In FIG. 2, the slider 7 is moved to a position where the end of the mouthpiece 22 of the cartridge coupled to the main body 10 is covered. In this state, the mouthpiece 22 may be safely protected from external impurities and kept clean.

The user may check the remaining amount of aerosol generating material contained in the cartridge by visually checking the protruding window 21a of the cartridge through the elongated hole 7a of the slider 7. The user may move the slider 7 in the longitudinal direction of the main body 10 to use the aerosol generating device 5.

Figure 3:
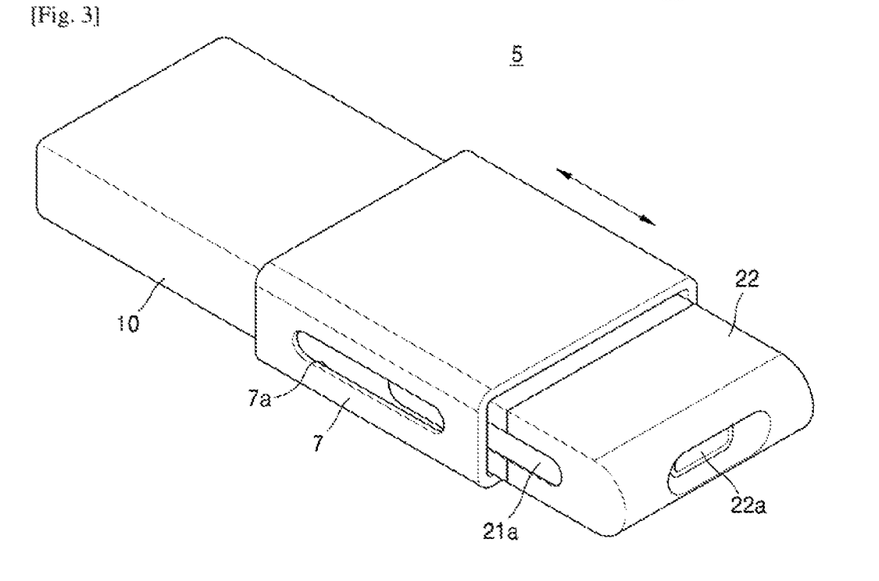
FIG. 3 is a perspective view of another exemplary operating state of the aerosol generating device of FIG. 1.

FIG. 3 is a perspective view of another exemplary operating state of the aerosol generating device according to the embodiment illustrated in FIG. 1.

In FIG. 3, the operating state is shown in which the slider 7 is moved to a position where the end of the mouthpiece 22 of the cartridge coupled to the main body 10 is exposed to the outside. In this state, the user may insert the mouthpiece 22 into his or her mouth and inhale aerosol discharged through the discharge hole 22a of the mouthpiece 22.

As shown in FIG. 3, the protruding window 21a of the cartridge is still exposed to the outside through the elongated hole 7a of the slider 7 when the slider 7 is moved to the position where the end of the mouthpiece 22 is exposed to the outside. Thus, the user may visually check the remaining amount of aerosol generating material contained in the cartridge, regardless of the position of the slider 7.

The structure of the aerosol generating device 5 described above with reference to FIGS. 1 to 3 is exemplary and the structure of the aerosol generating device 5 according to embodiments of the present disclosure is not limited thereto. Accordingly, a new structure not shown in FIGS. 1 to 3 may be further added, or some of the structures shown may be omitted or changed. For example, the aerosol generating device 5 may further include an interior space accommodating the cigarette.

Figure 4:
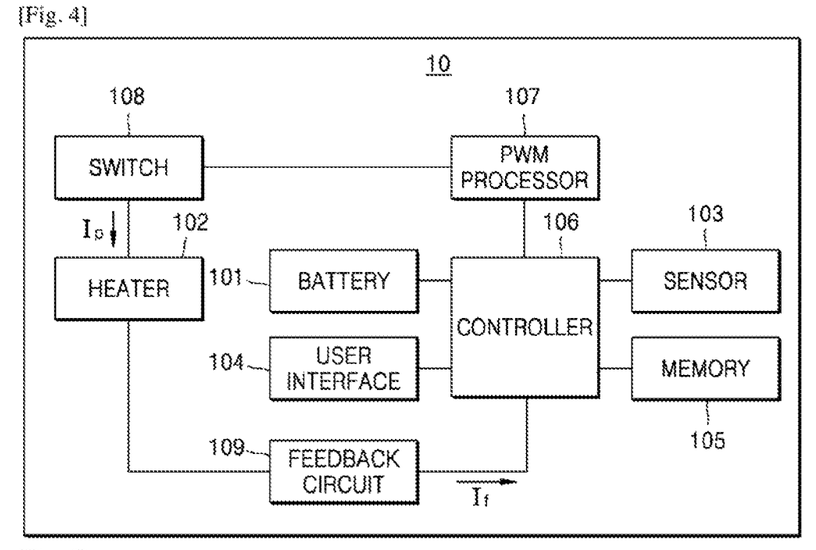
FIG. 4 is a block diagram illustrating hardware components of an aerosol generating device, according to an embodiment.

FIG. 4 is a block diagram illustrating components of an aerosol generating device, according to an embodiment.

Referring to FIG. 4, the aerosol generating device 5 may include a battery 101, a heater 102, a sensor 103, a user interface 104, a memory 105, a controller 106, a pulse width modulation (PWM) processor 107, a switch 108, and a feedback circuit 109.

However, the inner structure of the aerosol generating device 5 is not limited to what is illustrated in FIG. 4. One of ordinary skill in the art will understand that some components illustrated in FIG. 4 may be omitted or new components may be added, according to the design of the aerosol generating device 5.

In an embodiment where the aerosol generating device 5 includes a main body without a cartridge, the components of the aerosol generating device 5 may be located in the main body. In another embodiment where the aerosol generating device 5 includes a main body and a cartridge, the components of the aerosol generating device 5 may be located in the main body and/or the cartridge.

Hereinafter, the operation of each of the hardware components of the aerosol generating device 5 will be described without limiting a space in which each component is located.

The battery 101 supplies power used to operate the aerosol generating device 5. For example, the battery 101 may supply power such that the heater 102 may be heated. In addition, the battery 101 may supply power necessary for the operations of other components of the aerosol generating device 5. The battery 101 may be rechargeable or disposable. For example, the battery 101 may include a lithium iron phosphate (LiFePO4) battery, a lithium cobalt oxide (LiCoO2) battery, a lithium titanate battery, and a lithium polymer (LiPoly) battery but is not limited thereto.

The heater 102 receives power from the battery 101 under the control of the controller 106. The heater 102 may receive power from the battery 101 and heat a cigarette inserted into the aerosol generating device 5 or a cartridge mounted on the aerosol generating device 5.

The heater 102 may be located in a main body of the aerosol generating device 5. Alternatively, the heater 102 may be located in the cartridge 22. When the heater 102 is located in the cartridge 22, the heater 102 may receive power from the battery 101, which is located in the main body 10 and/or the cartridge 22.

The heater 102 may include a suitable electrically resistive material. For example, the suitable electrically resistive material may include a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome but is not limited thereto. The heater 102 may include a metal plate including a metal wire or an electroconductive track or a ceramic heating element but is not limited thereto.

In an embodiment, the heater 102 may be included in a cartridge 22. The cartridge 22 array include the heater 102, a liquid delivery element, and a liquid storage 21. An aerosol generating material accommodated in the liquid storage 21 may be absorbed by the liquid delivery element, and the heater 102 may generate an aerosol by heating the aerosol generating material absorbed into the liquid deliver element. For example, the heater 102 may include a material such as nickel-chrome and may be wound around the liquid delivery element or located near the liquid delivery element.

Alternatively, the heater 102 may heat a cigarette inserted into an accommodation space of the aerosol generating device 5. Because the cigarette is accommodated in the accommodation space of the aerosol generating device 5, the heater 102 may be located inside and/or outside the cigarette. Accordingly, the heater 102 may heat an aerosol generating material of the cigarette and thus generate an aerosol.

The heater 102 may include an induction heating heater. The heater 102 may include an electroconductive coil to heat a cigarette or a cartridge 22 using an induction heating method, and the cigarette or the cartridge 22 may include a susceptor which may be heated by an induction heating heater.

The aerosol generating device 5 may include at least one sensor 103. A sensing result of the sensor 103 may be transmitted to the controller 106, and the controller 106 may control the aerosol generating device 5 to perform various functions, such as control of the operation of the heater 102, limitation of smoking, determination of insertion or non-insertion of a cigarette (or a cartridge), and display of notification, according to the sensing result.

For example, the sensor 103 may include a puff detecting sensor. The puff detecting sensor may detect a user's puff based on a temperature change, a flow change, a voltage change, and/or a pressure change. The term "puff" may be used with the term "inhale" throughout the specification.

In addition, the sensor 103 may include a position change detecting sensor. The position change detecting sensor may detect a change in a position of the slider 7 slidably coupled to the main body.

The user interface 104 may provide a user with information about a state of the aerosol generating device 5. For example, the user interface 104 may include various interfacing elements, such as a display or a lamp which outputs visual information, a motor outputting tactile information, a speaker outputting sound information, terminals which exchange data with input/output (I/O) interfacing elements (e.g., buttons or touch screens) receiving information input by a user or outputting information to a user or receive charging power, and/or a communication interfacing module which performs wireless communication (e.g., Wi-Fi, Direct, Bluetooth, near-field communication (NFC)) with an external device.

The memory 105 may store various data processed or to be processed by the controller 106. The memory 105 may include various types of memory, such as dynamic RAM (DRAM), static RAM (SRAM), read-only memory (ROM), electrically erasable programmable ROM (EEPROM), etc.

The memory 105 may store data about an operating time of the aerosol generating device 5, a maximum puff count, a current puff count, at least one temperature profile, a user's smoking pattern, and the like. In addition, data required to determine the temperature of the heater 102 may be further stored in the memory 105.

The controller 106 may control overall operations of the aerosol generating device 5. The controller 106 includes at least one processor. A processor may be implemented as an array of a plurality of logic gates or may be implemented as a combination of a general-purpose microprocessor and a memory in which a program executable in the microprocessor is stored. It will be understood by one of ordinary skill in the art that the processor may be implemented as another type of hardware.

The controller 106 analyzes the sensing result of the sensor 103 and controls subsequent processes. For example, the controller 16000 may recognize a user's puff (i.e., release of aerosol to the outside) based on the sensing result of the sensor 103.

Based on the sensing result of the sensor 103, the controller 106 may control power supplied to the heater 102 such that the operation of the heater 102 starts or ends. Based on the sensing result of the sensor 103, the controller 106 may also control the amount of power supplied to the heater 102 and a power supply time such that the heater 102 may be heated to a certain temperature or maintained at a certain temperature.

The pulse width modulation (PWM) processor 107 enables the controller 106 to control power supplied to the heater 102 by way of transmitting a PWM signal to the heater 102. According to embodiments, the PWM processor 107 may be included in the controller 106, and a PWM signal output from the PWM processor 107 may be a digital PWM signal.

The switch 108 performs a switching operation such that a control signal (e.g., a PWM signal) generated by the controller 106 or the PWM processor 407 is transmitted to the heater 102. For example, when the switch 108 switches to an on-state, power is supplied to the heater 102. When the switch 108 switches to an off-state, power supply to the heater 102 is interrupted. For example, the switch 108 may include a field effect transistor (FET) which is switched on/off according to a control signal.

When a signal for heating the heater 102 is detected, the controller 106 may control the PWM processor 107 and the switch 108 such that power is supplied to the heater 102. The controller 106 may determine a supply current Ip, which is to be supplied to the heater 102, based an a predefined resistance of the heater 102 and power which has been supplied to the heater 102. At this time, the predefined resistance of the heater 102 may include a resistance value determined during the design or manufacturing of the heater 102 but is not limited thereto.

For example, the controller 106 may determine the supply current Ip for the heater 102 using the predefined resistance of the heater 102 and a voltage applied to the heater 102 according to a PWM signal.

The feedback circuit 109 feeds current, which flows in the heater 102 when power is supplied, from the heater 102 to the controller 106. The feedback circuit 109 may be connected between the heater 102 and the controller 106 and may output a feedback current If, which indicates the amount of current flowing through the heater 102, to the controller 106.

The resistance of the heater 102 may be affected by the temperature, and therefore, when the temperature of the heater 102 increases is heating, the resistance of the heater 102 also changes. Accordingly, a value of the supply current Ip determined based on the power that has been supplied to the heater 102 and the predefined resistance of the beater 102 may be different from a value of current actually flowing in the heater 102, and there may be a difference between the feedback current If and the supply current Ip.

The controller 106 compares the supply current Ip with the feedback current If and controls power supplied to the heater 102 based on the comparison result. The controller 106 may calculate a difference between the supply current Ip and the feedback current If and may estimate the temperature of the heater 102 based on the difference. The controller 106 may also control power supplied to the heater 102 according to the estimated temperature.

The controller 106 may estimate the temperature of the heater 102 based on a relationship between the difference between the supply current Ip and the feedback current If and the temperature of the heater 102. For example, the relationship between the current difference and the temperature of the heater 102 may be stored in advance as a lookup table (LUT) in the memory 105 of the aerosol generating device 5. A temperature of the heater 102 corresponding to each current difference value may be experimentally determined. For example, the relationship between current difference values and temperature values may be determined by repeatedly measuring a difference between the supply current Ip and the feedback current If, and a temperature of the heater 102 in a standard environment, and the determined corresponding relationship may be stored as an LUT in the memory 105.

The controller 106 may access the LUT, identify a temperature corresponding to the calculated difference between the supply current Ip and the feedback current If, and determine the identified temperature as the temperature of the heater 102.

In an embodiment, the controller 106 may control the amount of power supplied to the heater 102 and a power supply time such that the estimated temperature of the heater 102 reaches or remains at a target temperature in a temperature profile.

In an embodiment, the controller 106 may supply a certain amount of power, which is predetermined in accordance with the estimated temperature of the heater 102, to the heater 102. The relationship between the estimated temperature of the heater 102 and the amount of power may also be stored as an LUT in the memory 105. In this case, when the temperature of the heater 102 is estimated, the controller 106 may access the LUT, identify a power value corresponding to the estimated temperature of the heater 102, and control power corresponding to the identified power value to be supplied to the heater 102.

For example, predetermined power values may include a different power value for each puff count. When the estimated temperature of the heater 102 is T1, P11 power may be supplied to the heater 102 at the detection of a first puff, P12 power at the detection of a second puff, and P13 power at the detection of a third puff. When the estimated temperature of the heater 102 is T2, P21 power may be supplied to the heater 102 at the detection of a first puff, P22 power at the detection of a second puff, and P23 power at the detection of a third puff.

Figure 5:
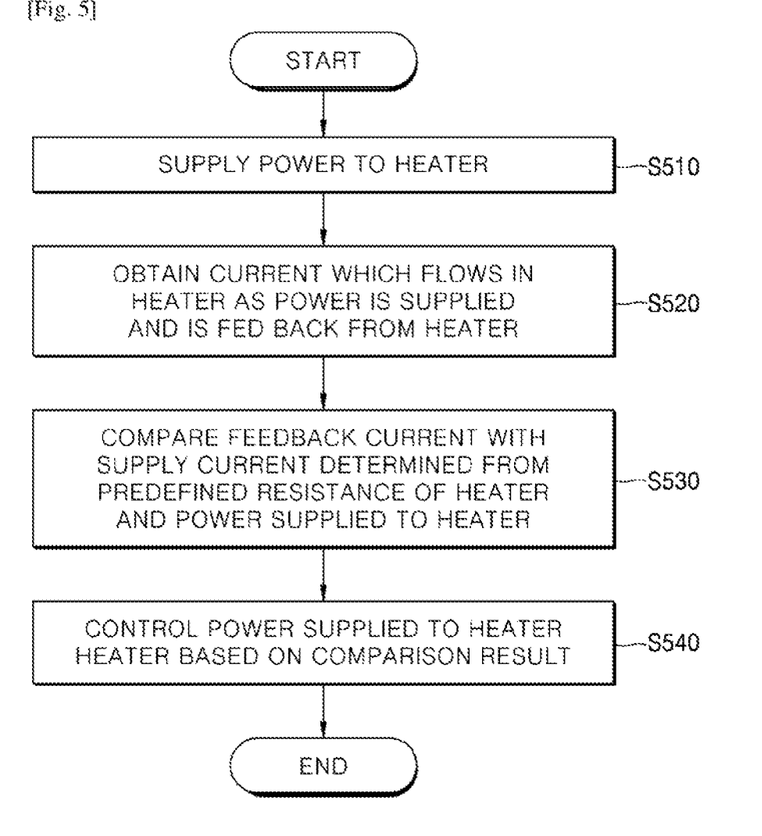
FIG. 5 is a flowchart of an operating method of an aerosol generating device, according to an embodiment.

FIG. 5 is a flowchart of an operating method of an aerosol generating device, according to an embodiment.

In operation S510, the aerosol generating device supplies power to the heater. For example, the aerosol generating device may generate a PWM signal and supply power to the heater according to the PWM signal.

In operation S520, the aerosol generating device obtains (i.e., measures) a current flowing into and fed back from the heater, as the power is supplied to the heater.

In operation S530, the aerosol generating device determines the supply current Ip, which is expected to be supplied to the heater according to the calculation based on a predefined resistance of the heater and the power supplied to the heater. The aerosol generating device compares the supply current Ip with the feedback current If fed back from the heater, and calculates a difference between the supply current Ip and the feedback current If.

In operation S540, the aerosol generating device may control power supplied to the heater based on the comparison result of operation S530. The aerosol generating device may estimate a temperature of the heater based on the difference between the supply current Ip and the feedback current If and may adjust power supplied to the heater according to the estimated temperature of the heater.

For example, the aerosol generating device may estimate the temperature of the heater based on the relationship between the difference between the supply current Ip and the feedback current If and the temperature of the heater. The relationship between the difference between the supply current Ip and the feedback current If and the temperature of the heater may be stored as an LUT in the aerosol generating device in advance. The aerosol generating device may access the LUT, identify a temperature corresponding to the difference between the supply current Ip and the feedback current If, and estimate the temperature of the heater based on the identified temperature.

Although operations S510 through S540 are sequentially described in FIG. 5, it is just an example, and embodiments are not limited to the time-sequential order. It will be understood by one of ordinary skill in the art that various changes may be made in the embodiments without departing from the fundamental characteristics thereof. For example, the described order of operations may be changed or at least two operations may be performed in parallel.

The operating method of an aerosol generating device may be written as programs executable in computers and may be implemented in general-use digital computers that execute the programs using a computer-readable recording medium. The structure of data used in the operating method of an aerosol generating device may be written to the computer-readable recording medium through various means. Examples of the computer readable recording medium include storage media such as magnetic storage media (e.g., ROM, RAM, floppy disks, hard disks, etc.) and optical recording media (e.g., CD-ROMs or DVDs).

Embodiments may provide an aerosol generating device estimating a temperature of a heater using current fed back from the heater, without using a separate sensor for detecting the temperature of the heater, and heating the heater to an appropriate temperature. Accordingly, a user may have uniform smoking experiences.

At least one of the components, elements, modules or units (collectively "components" in this paragraph) represented by a block in the drawings such as the controller 106, the user interface 104, the switch 108, the feedback circuit 109, and the sensor 103 in FIG. 4, may be embodied as various numbers of hardware, software and/or firmware structures that execute respective functions described above, according to an example embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above example embodiments may be implemented in algorithms that execute on one or more processors. Furthermore, the components represented by a block or processing steps may employ any number of related art techniques for electronics configuration, signal processing and/or control, data processing and the like.

Effects of the embodiments are not limited to those mentioned above, and other effects that have not been mentioned will be clearly understood by one of skill in the art from this specification and the attached drawings.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

The invention claimed is:

1. An aerosol generating device comprising:
a heater configured to heat an aerosol generating material to generate aerosol;
a memory storing a relationship between a plurality of current difference values and a plurality of heater temperature values as a lookup table; and
a controller configured to:
calculate a current flowing through the heater based on a predefined resistance of the heater and power supplied to the heater,
measure the current flowing through the heater, and
control power supplied to the heater based on a difference between the calculated current and the measured current,
wherein the controller is configured to estimate a temperature of the heater based on the difference, and adjust the power supplied to the heater according to the estimated temperature.

2. The aerosol generating device of claim 1, wherein the controller is configured to access the lookup table, identify a temperature corresponding to the difference between the calculated current and the measured current, and estimate the temperature of the heater based on the identified temperature.

3. The operating method of claim 1, wherein the estimating of the temperature of the heater comprises:
   identifying a temperature corresponding to the difference between the calculated current and the measured current, according to the pre-stored lookup table; and
   estimating the temperature of the heater based on the identified temperature.

4. The aerosol generating device of claim 1, further comprising a feedback circuit configured to feed back the current flowing through the heater to the controller, and
   wherein the controller determines the measured current by measuring the current fed back by the feedback circuit.

5. An operating method of an aerosol generating device, the operating method comprising:
   supplying power to a heater;
   calculating a current flowing through the heater by the power based on a predefined resistance of the heater and the power supplied to the heater;
   measuring the current flowing through the heater;
   accessing a pre-stored lookup table showing a relationship between a plurality of heater temperature values and a plurality of current difference values;
   controlling the power supplied to the heater, based on a difference between the calculated current and the measured current,
   wherein the controlling comprises obtaining the difference between the calculated current and the measured current, estimating a temperature of the heater based on the difference, and adjusting the power supplied to the heater according to the estimated temperature.

* * * * *